United States Patent
Menzies et al.

(10) Patent No.: US 8,315,889 B1
(45) Date of Patent: *Nov. 20, 2012

(54) HOME RESALE VALUE PROTECTION PLAN

(75) Inventors: Steven M. Menzies, Omaha, NE (US); Jeffrey A. Silver, Omaha, NE (US); Christopher W. Overton, Alameda, CA (US)

(73) Assignee: Pricelock Finance, LLC, Omaha, NE (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/760,629

(22) Filed: Apr. 15, 2010

Related U.S. Application Data

(60) Provisional application No. 61/170,791, filed on Apr. 20, 2009.

(51) Int. Cl.
*G06Q 40/00* (2012.01)

(52) U.S. Cl. .................................. 705/4; 705/35; 705/38
(58) Field of Classification Search ..................... 705/4
See application file for complete search history.

(56) References Cited

U.S. PATENT DOCUMENTS

2004/0260578 A1\* 12/2004 Jin .................................... 705/4
2007/0271163 A1\* 11/2007 Schaufenbuel ................ 705/35

\* cited by examiner

*Primary Examiner* — Shahid Merchant
*Assistant Examiner* — Stephanie M Ziegle
(74) *Attorney, Agent, or Firm* — Mark Nowotarski

(57) ABSTRACT

A Home Resale Value Protection Plan provides a payment to a homeowner should the homeowner have to sell his or her house at a loss, wherein the loss is attributable to an overall drop in the housing market. In exchange for an upfront fee, the homeowner would receive a payment for the lesser of their actual loss or the loss calculated by multiplying their original purchase price by the proportional drop in an appropriate published house price index.

1 Claim, 5 Drawing Sheets

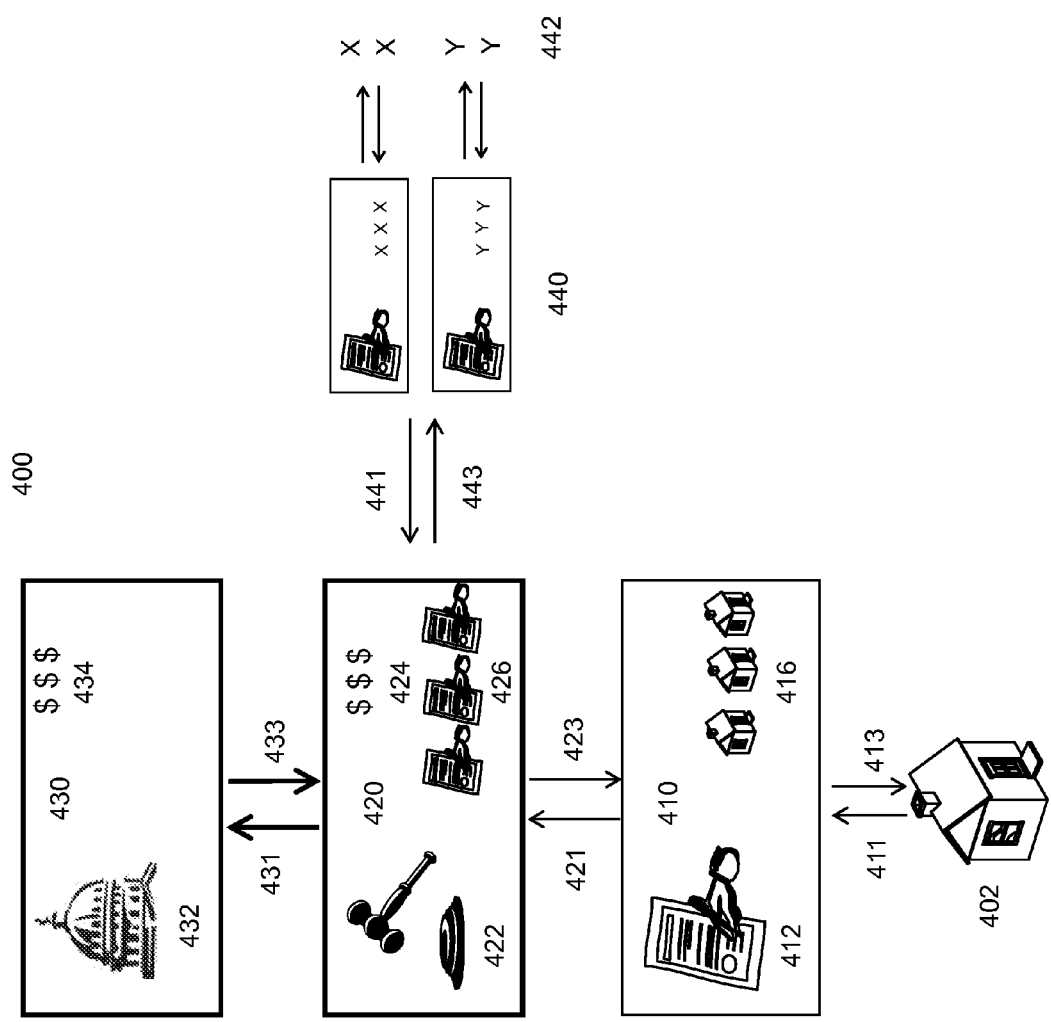

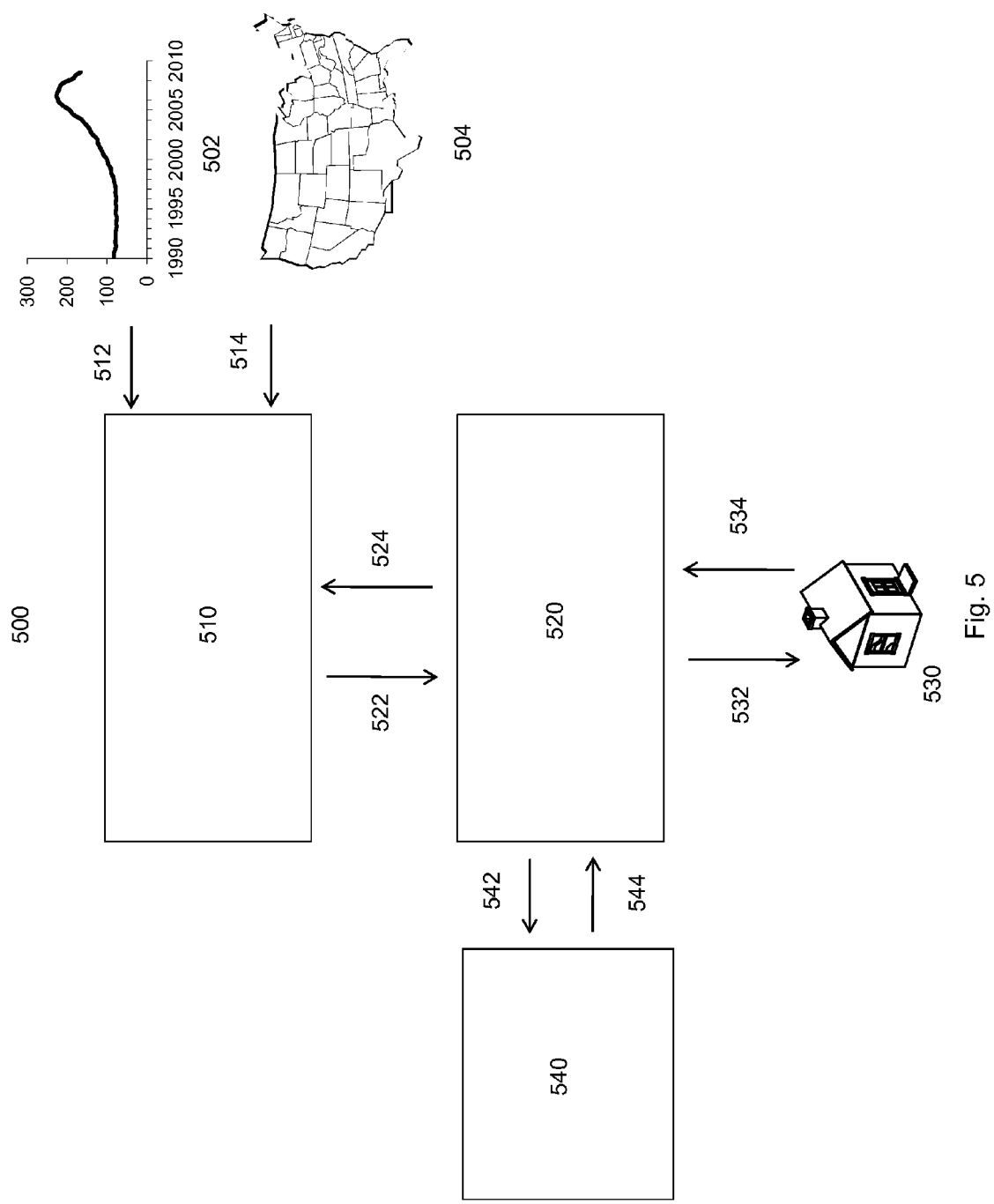

HOME RESALE VALUE PROTECTION PLAN

CROSS-REFERENCE TO RELATED APPLICATION

The application claim priority to US provisional patent application "Home Resale Value Protection Plan", Ser. No. 61/170,791, filed Apr. 20, 2009. Said provisional patent application is incorporated herein by reference.

FIELD OF INVENTION

This invention is in the field of financial protection.

BACKGROUND

There is long felt need for protecting homeowners from price fluctuations in the housing market.

SUMMARY OF THE INVENTION

The Summary of the Invention is provided as a guide to understanding the invention. It does not necessarily describe the most generic embodiment of the invention or all species of the invention disclosed herein.

A homeowner can be protected against an overall downturn in the housing market by participating in a Home Resale Value Protection Plan. A Home Resale Value Protection Plan is a contractual agreement between a Financial Services Provider and one or more homeowners. In exchange for a fee, each homeowner is entitled to a payment for a compensatable loss that he or she might experience when he or she resells his or her residence. The compensatable loss might be the actual loss he or she suffers or the loss that can be attributed to a market down turn, whichever is lesser.

The value of a Home Resale Value Protection Plan to a homeowner can be substantially increased if the Financial Services Provider is covered by one or more Contractual Liability Insurance policies. The Contractual Liability Insurance policy protects the homeowner in case the Financial Services Provider should be unable to satisfy the terms of the Home Resale Value Protection Plan contract.

The value of the insurance to the homeowner is further increased if the insurance provider is an Admitted Carrier in a given State. Thus, if both the Provider and the Carrier should fail, the homeowner would receive at least some compensation from the Insurance Guarantee fund of the State that licensed the Admitted Carrier and in which the Contractual Liability Insurance policy was issued.

BRIEF DESCRIPTION OF DRAWINGS

FIG. 4 illustrates how insurance can be provided for Home Resale Value Protection Plans, and other Financial Protection Plans.

FIG. 5 illustrates a particular computer implemented information system capable of providing real time quotes to a prospective buyer of a Home Resale Value Protection Plan.

DETAILED DESCRIPTION OF INVENTION

The following detailed description discloses various embodiments and features of the invention. These embodiments and features are meant to be exemplary and not limiting.

Housing markets rise and fall in uncertain ways. This uncertainty means that homeowners can be exposed to significant financial risk when they purchase a residence. This, in turn, can inhibit them from making the housing transitions they need when they need to make them.

Figure 1:
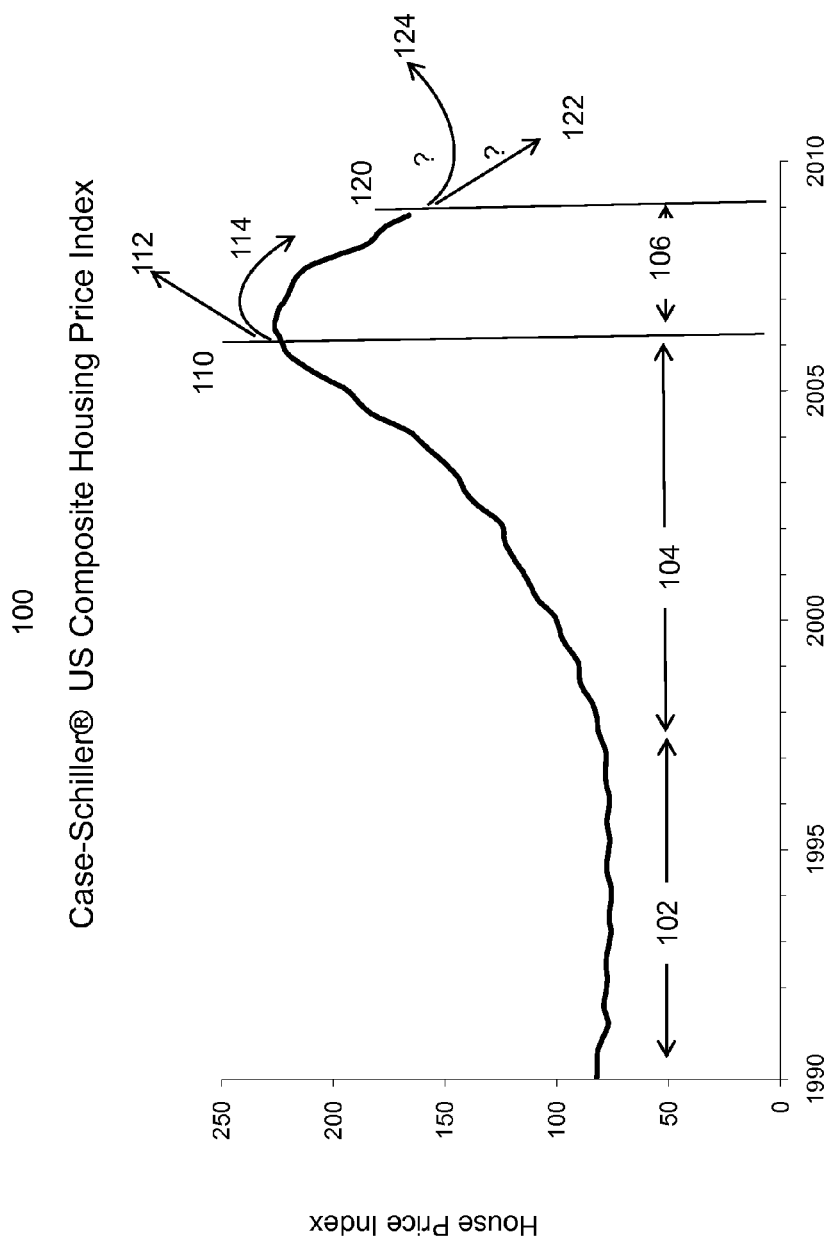
FIG. 1 is a graph of the Case-Schiller® US Composite Housing Price Index from 1990 to 2008.

FIG. 1 illustrates the nature of the uncertainty in the housing market. It shows a graph 100 of the Case-Schiller® US Composite Housing Price Index for 1990 to 2008. This index is a measure of US housing price shifts due to market conditions. It is in nominal units with the value set at 100 for the year 2000. It is not corrected for inflation.

From 1990 to 1998 (102), the US housing market was relatively flat. From 1998 to 2006 (104), the US housing market increased at an accelerating rate. From 2006 to 2008 (106), the US housing market decreased at an accelerating rate.

The uncertainty stems from the fact that whereas for most of the time, recent housing price trends give an indication of future price movements, there are other times when the market makes a dramatic and unexpected change. A buyer in 2006 (110), for example, looking back at the then recent trends in the Case Schiller® Index, might expect the future housing prices to continue to increase 112. In fact, it underwent a dramatic decrease 114.

Similarly, a buyer at the current time of 2009 (120), might anticipate that prices will continue to decrease 122, but for any number of reasons, prices might instead level off or even increase 124.

The difference between what buyers and sellers as a whole might anticipate what a market might do in the future, and what it actually does, provides an opportunity for a Financial Service Provider to offer a Home Resale Value Protection Plan.

A Home Resale Value Protection Plan is a contractual agreement between one or more home buyers and a Financial Service Provider. In exchange for a fee, such as a fee in the range of 0.5 to 5.0% of a home sale price, the Financial Service Provider agrees to compensate a homeowner for losses he or she might experience when he or she sells his or her home in the future as a result of certain specified causes. The losses might be the lesser of the actual losses he or she experiences or the losses attributable to the drop in an appropriate housing price index. An appropriate index is a Case-Schiller® Housing Price Index. The Housing Price Index may be selected for the smallest geographic region available that encompasses the house in question. The details of an exemplary Home Resale Value Protection Plan, including alternative suitable indices, are described in more detail in Appendix A.

A Financial Service Provider can increase the financial strength[1] of a Home Resale Value Protection Plan by adjusting the availability of the Plan according to, among other measures, geography and time.

[1] "Financial Strength" of a Home Resale Value Protection Plan can be measured by, inter alia, the credit rating of the Financial Service Provider providing said Plan.

Figure 2:
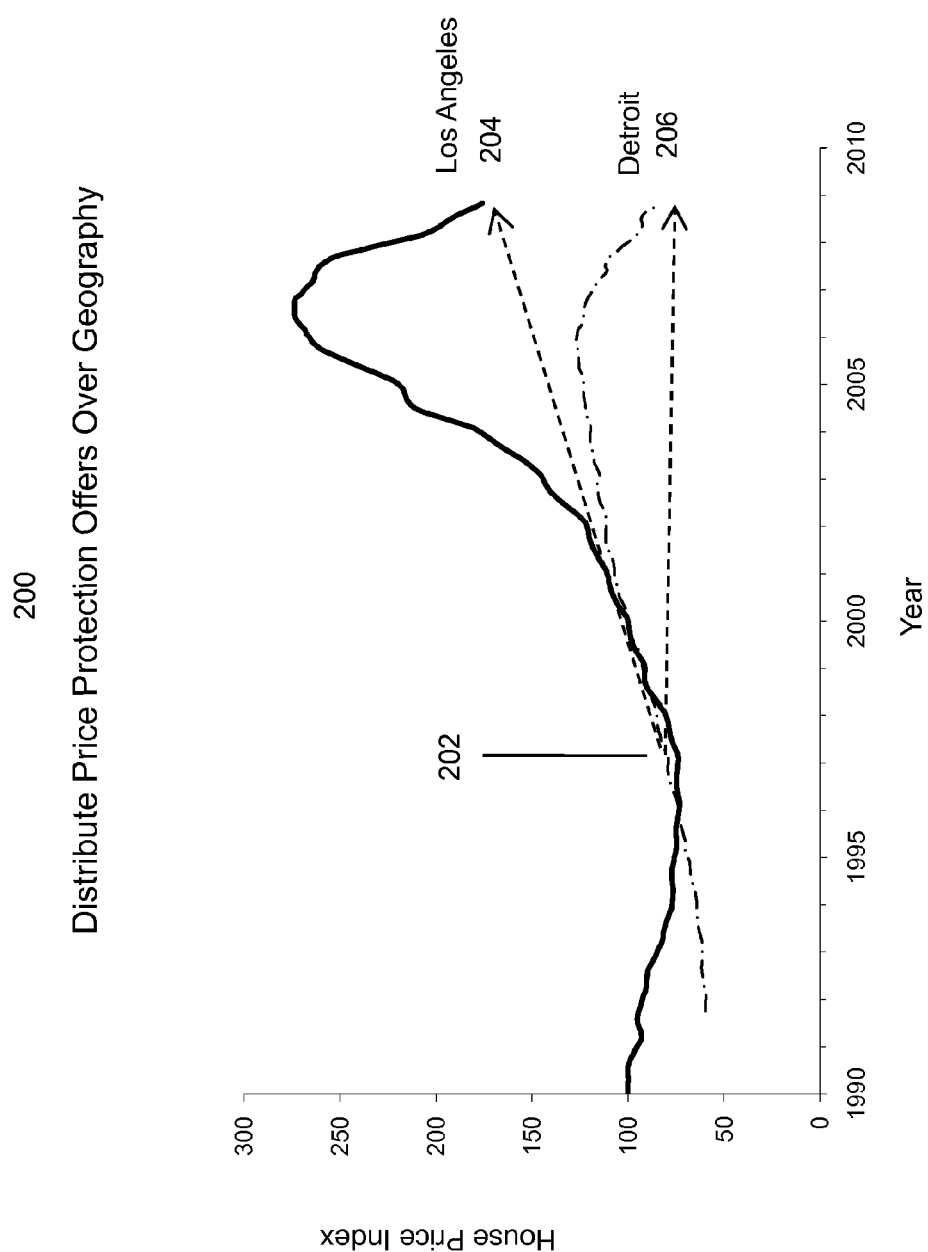
FIG. 2 is a graph showing how the financial strength of a Financial Service Provider can be increased by selling Home Resale Value Protection Plans over different geographies.

FIG. 2 illustrates 200 how the housing price index for two different geographies, Los Angeles and Detroit, compare for the time period of 1990 to 2008. A Financial Service Provider offering Plans in 1997 (202), can increase its overall financial strength by offering plans to both Los Angeles 204 home buyers as well as Detroit 206 home buyers despite the then recent slide in Los Angeles housing prices. If those home buyers then resold their homes in 2008, the Los Angeles home buyers would have seen an overall appreciation whereas the Detroit home buyers would have seen a modest depreciation. Thus the fees collected from the Los Angeles home buyers would have been available to compensate the Detroit home buyers according to the Plan.

Figure 3:
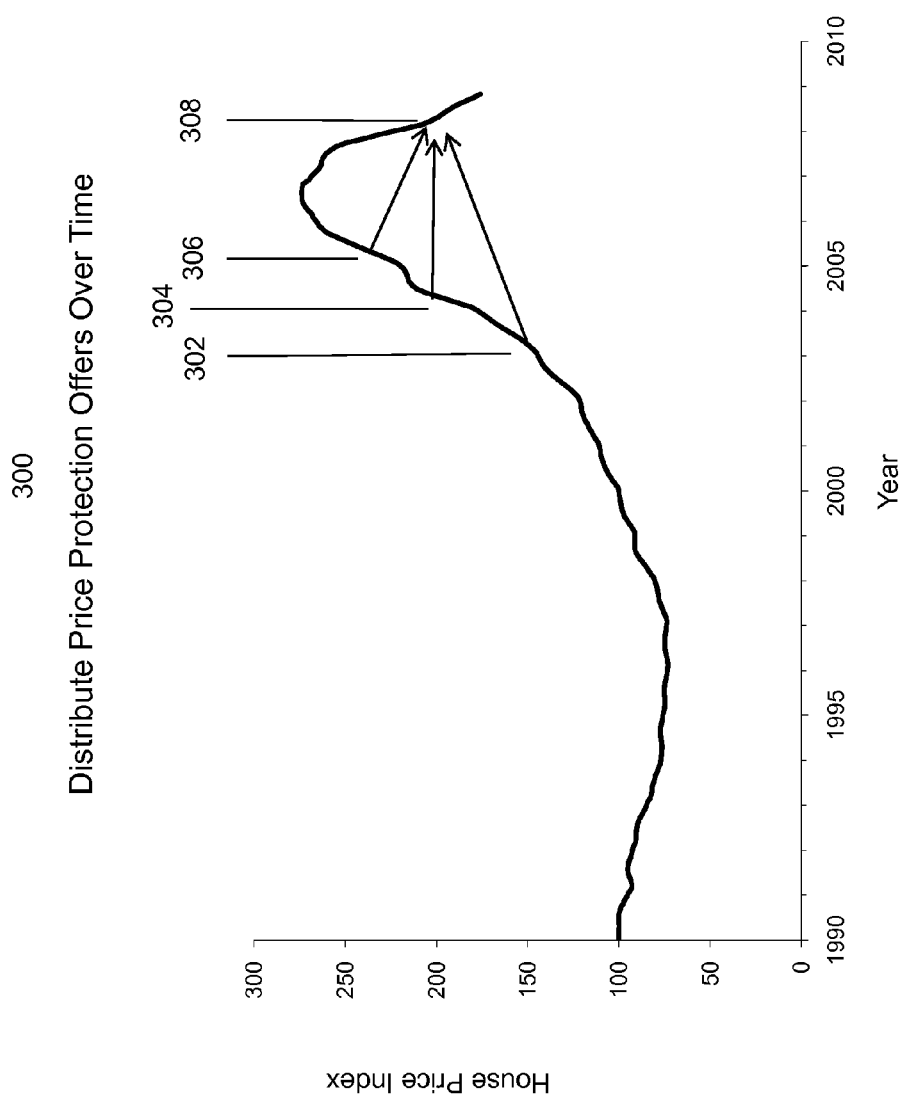
FIG. 3 is a graph showing how the financial strength of a Financial Service Provider can be increased by selling Home Resale Value Protection Plans over different times.

FIG. 3 illustrates 300 how a Financial Service Provider can increase the financial strength of a Plan by making sure that inception dates for Plans are distributed over time. If Plans are made available at different times, then fees collected from Homeowners that bought at different times, but ultimately sold at the same time would be available to compensate those that suffered a loss. In the example shown, homeowners that purchased at time 302 and 304 either gained or broke even if they sold at subsequent time 308. Their fees would be used to compensate homeowners that purchased at time 306 and sold at time 308 and hence suffered a loss.

System for Providing Insurance for Plans

FIG. 4 illustrates 400 a method and system for providing insurance to a Financial Service Provider providing Home Resale Value Protection Plans.

Homeowner 402 seeking to obtain a Home Resale Value Protection Plan applies 411 to a Financial Service Provider 410. If the homeowner meets the underwriting criteria of the Plan, which may include the above considerations about geographic and time distribution of all Plans 416, then the homeowner is approved 413 and a Plan 412 is issued.

As part of the sales process, the Financial Service Provider can make the assertion that the Plan is fully insured if the Financial Service Provider obtains a Contractual Liability Policy from an Insurer 420. A Contractual Liability Insurance Policy provides that if the Financial Service Provider cannot meet the obligations of any of its Home Resale Value Protection Plans, then the Insurance Company will step into its shoes and, up to a certain limit of liability, meet the Financial Service Company's obligations under the Plan. The insurance company, for example, might insure each Plan up to $1,000,000. An exemplary insurance policy is shown in Appendix B.

The Financial Service Provider obtains Contractual Liability Coverage by applying 421 to a property casualty insurance company 420 for coverage. If the Financial Service Provider meets the underwriting criteria and pays the appropriate premium, then insurance coverage 423 will be provided.

Thus, even though a Home Resale Value Protection Plan is not considered insurance, it can nonetheless be insured to the benefit of the homeowner participating in the Plan.

There is additional security for the homeowner if the insurance carrier is an Admitted Insurance Carrier in a given State. In order to get admitted, a carrier must apply 431 to each State's Insurance Department 430. If the carrier meets the State's requirements for admission, such as financial strength measured by appropriate capital and surplus 424 and the use of approved insurance forms 422 (e.g. approved Contractual Liability Policy Forms), then it will be admitted 433 to write the approved insurance policies in that State.

The homeowner does not have to be in the same State that the insurance carrier is admitted to in order for his or her Plan to be insured. The carrier can cover the homeowner through an appropriate insurance certificate issued under a master policy to the Financial Service Provider.

The financial strength of admitted insurance carriers is continually monitored. If the State should determine that an admitted carrier might not be able to meet its obligations, then the State might take over the carrier. The State would then access its Guarantee Fund 434 to pay the obligations of the carrier up to certain limits. These limits might be prescribed by the insurance statutes 432 of each State.

One of the surprising benefits of having the carrier be an admitted carrier is that it may be possible for the Financial Service Provider to purchase a "shell" insurance carrier for the specific purpose of providing insurance for its Home Resale Value Protection Plans. A shell insurance carrier is a carrier that is admitted in a given State or States to sell a given insurance coverage, but has little or no business. The shell may be owned by the Financial Service Company, but it is nonetheless fully regulated by the State. Homeowners are therefore protected by the State's regulatory oversight of the carrier and the availability of the State's Guarantee Fund should the carrier fail.

The financial strength of the insurance company can be further strengthened by offering 441, 443, Contractual Liability Policies to other entities 440 who might be providing different financial protection products 442 that are similar in nature to a Home Value Protection Plan at least to the extent that they are not classified or regulated as insurance. The insurance company can therefore develop a portfolio of policies 426 and thus distribute its overall risk. Any extended warranty sold with a product could be insured by a financial guarantee product. Electronics such as televisions, cameras and other high end electronics are usually accompanied by an offer of an "extended warranty" to repair and/or replace the product within a certain time frame. Other large consumer purchases such as washers, refrigerators, dryers, computers, air conditioners, furnaces and automobiles all offer after market warranties which are usually not treated as pure insurance products but are usually described as "Service Contracts."

Computer Implementation

FIG. 5 illustrates an exemplary computer based system 500 for implementing a real time quotation process for Home Resale Value Protection Plans. The system comprises a Transactional System 520 and an Analytic System 510.

Types of Policies Offered

Coverage in Home Resale Value Protection Plan contracts may be one of several Policy Types, with risks and claims depending on complex interactions between the larger economy, local economic and demographic characteristics, the demographics and lives of the homeowners, and the specific property protected. Though this combination of policy coverage is new, some risks are addressed by purely financial products (such as equity index options), some by mortgage insurance, and some (e.g. death and disability coverage) by property and casualty insurance.

All policy options include losses to home value upon resale if certain conditions are met.

A first loss policy covers losses to home value upon resale subsequent to death, disability, or hardship experienced by one of the contracted homeowners.

A joint loss policy covers losses to home value upon resale subsequent to death, disability, or hardship experienced by all contracted homeowners.

A retirement policy covers losses to home value upon resale after at least the contracted number of years (the expected time for retirement), in addition to coverage as in a first loss policy above.

A full policy covers losses to home value upon resale after at least a specifically contracted number of years, in addition to coverage as in a first loss policy above.

In each case, policies may expire (unless renewed) after a larger, also specifically contracted, number of years.

Back-End Systems

The Home Resale Value Protection Plan includes two back-end systems:

1) A Transactional System 520 is housed in a web site that is able to generate prospective contract documents in real time. These documents include Plan Pricing specific to:
   a) The Plan Type sought
   b) The applicant or applicants (e.g. ages for contract options related to subsequent disability)
   c) The protected residence (including exact location, and expected selling price.)
   d) In addition, the actual Sale Price at the time the Plan document is generated may not be finalized. Thus the document specifies how the pricing depends on actual sale price.

2) An offline Analytic System 510 is used to maintain risk models used to populate data underlying the transactional site.

We describe these two systems and their connections.

1. The Transactional System

After a purchase offer has been made for an eligible residence 530, a real estate broker who has contracted for permission to sell Home Resale Value Protection Plans enters information 534 on the prospective sale at the Transactional System web site. He or she then receives a prospective plan contract 532 for the buyer to sign along with closing documents. Upon receipt 542 of closing documents, the Financial Service Provider 540 then ratifies 544 the final plan. Since the prospective plan contract is generated before closing, it is subject to some revision based on actual Sale Price. The actual sale price is expected to lie within a range of the offered price, and specifies how the Plan Price depends on the Sale Price (a linear function within a specified range.)

In another implementation, the prospective contract may be generated based on an offered price, in which case there is even more uncertainty in final Sale Price.

Since the Transactional System must perform reliably and quickly without human oversight, all difficult calculations (discussed more fully for the Analytic System) must have been performed previously. This limits the complexity of how Plan Price depends on location, Sale Price, Plan Type, and attributes of homeowners.

In addition, the Transactional System enforces, in real time, the underwriting restrictions of the Financial Service Provider. This is accomplished by specifying by zip code, the start date, end date, and pricing characteristics acceptable to the Financial Service Provider to generate prospective plan contract documents. Once generated, this document then specifies a latest date by which the sale must close and the supporting materials that must be received by the Financial Service Provider in order for the Home Resale Value Protection Plan to enter into force as specified.

Zip codes may change over time, or may include parts of multiple cities, counties, or even metropolitan divisions or metropolitan statistical areas (as defined by the US Office of Management and Budget and possibly revised after each decennial US Census.) Thus, the Transactional System will only issue prospective plan contracts when these additional data are entered in their expected relationship to the zip code.

2. The Analytic System

Predicting future resale prices of homes in the long term is known to be a very complex problem. In fact, actions based on failure to anticipate downturns in US home prices are recognized as one of the root causes for the US recession that began in 2007 and that spread to a global recession. Besides millions of homeowners who failed to anticipate their loss in equity in their homes, inadequate forecasting was also done by the many professionals dedicated to this task in such companies as banks, home builders, and mortgage insurers.

In order to remain financially viable, the Financial Service Provider must forecast not only regional changes in home prices, but also how this translates into losses from Home Resale Value Protection Plans. We categorize some of the difficulties and discuss how a Home Resale Value Protection Plan's Analytic System addresses them.

A. Limited benefits of diversification during periods of extreme price movement. As during periods of large, synchronized decreases in equity markets, the (geographical) correlation in home price declines has been very high (especially when considered within large clusters) compared to historical standards. This undermines usual actuarial modeling of distributions of independent events.

B. Behavioral economics: macroeconomic, regional, and specific to industrial sectors. Both optimism and pessimism tend to be contagious both within and between national and regional economies. Extensive literature[2] reviews discuss how financial markets and housing markets tend to overshoot "rational" prices in both directions, showing intervals of high, and often unexpected, volatility. The Analytic System includes an "optimism" metric that predicts the extent price of change along the current trajectory. This is built from trends in rental vacancies as compared to housing vacancies, local price movement in relation to inflation and incomes, housing permits, starts, and inventory available for purchase.

[2] E.g. Irrational Exuberance, ed. 2, by Robert Shiller, 2005 (incorporated herein by reference).

C. Price patterns particular to housing. Since a large fraction of homeowners leverage their purchases by borrowing (through mortgages), their first loss position quickly erodes their equity should markets decline. Thus, sellers are very reluctant to sell at a loss, so that lowered optimism is evidenced first by decreases in sales volume before prices begin to drop. Thereafter, sellers begin to accept losses if they are forced to, at which point price decreases may accelerate in a behavioral downturn. Conversely, housing euphoria tends to perpetuate itself, as buyers fear being priced out of the market if they do not quickly close a purchase. The Analytic System includes 512 a "housing cycle" metric 502 that indicates the depths of euphoria or pessimism. This is built from movement of prices and sales volume.

D. Data at varying geographical granularities, and of varying quality. The best estimate for housing might simply be based on desired variables at the smallest possible granularities in geography and in time. However, the same metric might vary much more in some locations, might be collected less reliably in some locations, and might simply be missing for some areas. This becomes especially difficult when combining data of several types, which besides having varied individual data problems, might be collected in very different ways and at different geographical granularities. For example, the Bureau of Labor Statistics specifically limits local reporting on employment for those industries in which there are too few employers to protect anonymity of their individual results. Within these constraints, good data are often available by county or even by city. By contrast, the main providers of housing price indexes usually offer no finer granularity than for metropolitan statistical areas.[3] The risk of loss to the Financial Service Provider is much more sensitive to such issues of varying data quality and granularity than is a raw price forecast. For this reason, the Analytic System computes a "missing data risk" multiplier to model related uncertainty. This model is based 514 on outlier behavior for local time series and on known geographical variation 504 extrapolated from other metrics.

[3] Such indexes are needed, because raw home sale data, say as available from Multiple Listing Sales systems, fail to correct for different ways that sales patterns vary across price tiers, such as when more sales occur among lower-priced properties as wealthier homeowners try to wait out a housing recession.

E. Data delay. Some data (such as annual crime statistics) may be delayed by many months or even over a year, with data revisions delayed even more. The Analytic System thus forecasts underlying metrics to synchronize them in time. This allows for better unified modeling. Forecast uncertainty is included in missing data risk mentioned above.

F. Unexpected legislative policy changes. Since legislation is affected by individual personalities, it is very hard to forecast. In some cases, one can make good guesses about which direction forces, with certainty akin to the "laws of physics", will move policy. However, details and timing of such changes are difficult to forecast. The Analytic System includes override settings where effects not readable from current time series may be entered. For example, when, in periods in 2008 and 2009, foreclosures appeared to decrease in several of the hardest-hit states (such as California), it was due to temporary delays in foreclosure proceedings by certain large lenders, in anticipation of new federal measures to mitigate foreclosures. Earlier temporary drops in a few states were due to specific legislative changes.

G. Changes related to lending. The Analytic System includes affordability metrics, based on the relation of "typical" mortgage payments to "typical" income. In locations where the former is higher, associated with lower home ownership rates, changes in this relation affect a different part of the income distribution, which also is estimated. However, purchase prices are affected not just by the cost of loans, but also by the availability of loans. This macroeconomic effect (sometimes with regional variation) is sensitive to the health and/or life support given to lenders, such as banks and government sponsored agencies (e.g. Fannie Mae and Freddie Mac.)

H. Varying tenure before reselling, and interaction with age. These are also modeled by the Analytic System.

I. Long-term local economic growth. Much macroeconomic literature deals with longer-term dynamics of economic development, usually at the level of whole countries. Such forecasts are notoriously fraught with error, but incorporate such data as population growth (by age, level of education, and other demographics, and due to migration in and out), employment growth (dependent on characteristics of labor markets and of the industries that employ them), and income growth (related to employment, and such other forms of income as from investments and government support.) To adapt this to a demand model for local housing markets, the Analytic System also considers scarcity of housing, and such forms of desirability of an area as weather, favorable trends in crime rates, commute times, and quality of schools.

J. Special considerations during the late 00's recession. Many of the dynamics in the housing market from 2006 onward include extreme events not seen previously in available US data, are associated with large departure from previously observed patterns, and are expected to settle down to steady-state conditions very different than before. At this point we mention localized foreclosure waves and unprecedented prevalence of distress sales. Since we lack empirical data for many of the combinations observed during this period, the Analytic System must model these conditions dynamically, making frequent adjustments in response to new incoming data, until a new regime has emerged and the markets are more stabilized.

3. Relationship Between Analytic System and Transactional System

The Analytic System provides updated pricing models 522 to the Transactional System. The updated models may be provided on a periodic basis, such as daily, or an ad hoc basis, such as when a pricing model is updated due to a significant but unforeseen event. The Analytic System also receives 524 information from the Transactional System. This information may include number of plans sold, sale price etc. The Analytic System can then take this information into account when developing pricing models.

Optimism Metric

Background and examples for computation of optimism metrics are discussed below.

Underlying a target time series $g(t)$, such as a local home price index, is a long term trend function $f(t)$. Said function may be a line constructed from an exponentially weighted moving average of recent values and differences, or it may be amalgamated from multiple such pieces, as follows.

Suppose $f(t)$ consists of an historical part $f\_0(t)$ (defined for $t<=0$) and a forecast part $f\_1(t)$ for $t>=0$, where t is time relative to the present and f is an expected housing price index. Said forecast part may take into account new demographic or financial patterns. For example, $f\_0(t)$ might have grown at 3% a year up to a present value of 100, but $f\_1(t)$ is expected to grow at 5% a year, say due to recently received demographic survey information indicating rising local wages and an influx of skilled workers able to afford houses.

Then we construct the function $f(t)$ as:

$$f(t)=s(t/h)f\_0(t)+s(-t/h)f\_1(t)$$

where $s(x)=1/(1+e^{-x})$ is a logistic function, and h (roughly a "half life") is a time interval to transition between functions.

$f(t)$ is then viewed as a general trend to which actual price indices are compared.

Optimism(t) is a non-negative function defined out of three functions of time that also depend on the time series:

$$\text{Optimism}(t)=\text{heightAboveTrend}(t)*\text{slopeAboveTypicalSlope}(t)/\text{vulnerability}(t)$$

Here heightAboveTrend(t) may be the number of standard deviations of $\{g(t)-f(t)\}$ that $g(t)$ is greater than $f(t)$ at a particular time t, where $g(t)$ is an actual housing price index.

slopeAboveTypicalSlope(t) may be the recent rate of change of $g(t)$ divided by a "typical" slope value of $g(t)$ (such as an historical slope of trend or a more general inflation rate).

vulnerability(t) is larger than 1 when there appears to be a risk that $g(t)$'s current rate of increase will worsen. A suitable formula for vulnerability(t) is:

$$\text{vulnerability}(t)=1-c\_1*g''(t)+\text{volatility}(g \text{ around time } t)/(\text{"typical" volatility of } g)$$

Where $c\_1$ is a user selectable parameter. Again, $g''(t)$ and its volatility near time t are shorthand for a form of averaging (such as exponential weighting) that places the greatest weights on recent values.

So optimism is positive when three conditions are met:
1) The target function is better than typical
2) Its rate of increase is higher than typical
3) Its rate of increase is not either slowing down or volatile In bubbles with "inertia" (such as housing prices), optimism tends to diminish long before prices actually decline. Conversely, optimism tends to build as a rally in prices begins.

In time series with less inertia (e.g. volatile financial series), volatility is much higher, translating into higher vulnerability, and thus into lower effective optimism.

Once a decline attains more inertia, the optimism metric no longer applies, and is replaced by a similarly formed fear metric taking only negative values. Thus, both behavioral attributes may be stored in a single variable.

Optimism is defined relative to a set of default expectations embodied by the trend f(t). It may be constructed to reflect increased demand, restrictions in supply, or both. If needed (and forecastable), the same technique as used above may extend f(t) to a longer-term forecast glued together from smoothing of several linear (or non-linear) pieces. Optimism attempts to capture the behavioral deviation from long-term equilibrium, and as such is useful mainly for short to mid-term corrections to "rational" forecasts.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

The invention claimed is:

1. A system for providing real time Home Resale Value Protection Plan price quotes to a prospective buyer comprising:
   a. a computer based Transactional System for providing said real time Home Resale Value Protection Plan price quotes based on a pricing model; and
   b. a computer based Analytic System for updating said pricing model;

wherein:
   c. said Analytic System is configured to accept information on issued Plans from said Transaction System and to update said pricing model based at least in part on said information;
   d. said pricing model is configured to calculate an optimism metric from a first time t1 to a second time t2; and
   e. the magnitude of said optimism metric calculated at time t is less than or equal to:

$$\text{heightAboveTrend}(t) * \text{slopeAboveTypicalSlope}(t) / \text{vulnerability}(t)$$

* * * * *